／United States Patent [19]
Wall et al.

[11] 3,857,798
[45] Dec. 31, 1974

[54] CONDUCTIVE INK COMPOSITION CONTAINING PD AND PB METAL POWDERS

[75] Inventors: David Thomas Wall, Shirley; Neil Albert Burr, Quinton, both of England

[73] Assignee: Joseph Lucas (Industries) Limited, Birmingham, England

[22] Filed: July 27, 1972

[21] Appl. No.: 275,884

[30] Foreign Application Priority Data
July 27, 1971 Great Britain .................... 35315/71

[52] U.S. Cl. .............. 252/514, 174/68 A, 174/68.5, 252/512, 252/518
[51] Int. Cl. .......................... H01b 1/02, H01b 1/08
[58] Field of Search .................... 252/514, 518, 512; 174/68 A, 68.5

[56] References Cited

UNITED STATES PATENTS

| | | | |
|---|---|---|---|
| 2,947,646 | 8/1960 | Devaney et al. | 252/514 X |
| 3,679,439 | 7/1972 | Milgram | 252/514 |

FOREIGN PATENTS OR APPLICATIONS

| | | | |
|---|---|---|---|
| 1,026,577 | 4/1966 | Great Britain | 252/514 |
| 575,925 | 5/1959 | Canada | 252/514 |
| 575,922 | 5/1959 | Canada | 252/514 |

*Primary Examiner*—Harvey E. Behrend
*Assistant Examiner*—R. E. Schafer
*Attorney, Agent, or Firm*—Holman & Stern

[57] ABSTRACT

An ink for use in thick film printed circuits comprises palladium powder, lead powder, the ratio of the weight of the palladium powder to the weight of the lead powder being in the range of 3:1 to 3:2 an inorganic bonding material and a binder liquid.

7 Claims, No Drawings

CONDUCTIVE INK COMPOSITION CONTAINING PD AND PB METAL POWDERS

This invention relates to thick film circuits of the kind formed by printing areas of a metal-containing ink on a refractory substrate and heating the substrate to harden the ink.

With such circuits some difficulty has been experienced when using conventional inks to make soldered joints between printed areas of the circuit and wires. It has been found that a joint which is initially satisfactory weakens with age particularly if subjected to a wide variation in temperature conditions.

Accordingly it is an object of the invention to provide a thick film circuit of the kind specified to which the making of satisfactory soldered joints is facilitated.

A thick film circuit in accordance with the invention includes printed joint areas formed of an ink incorporating palladium, lead, and an inorganic bonding material wherein the ratio of the palladium content to the lead content is in the range of 3:1 to 3:2 by weight.

In accordance with another aspect of the invention, there is provided an ink for use in the manufacture of thick film circuits as above defined, said ink incorporating palladium powder, lead powder, the ratio of the weight of the palladium powder to the weight of the lead powder being in the range of 3:1 to 3:2 an inorganic bonding material and a binder liquid.

The optimum palladium/lead ratio is in the region of 65:35.

The ratio of the total weight of the metal powder to the weight of the inorganic bonding material is preferably in the range of 50:1 to 5:1.

The amount of binder liquid added is sufficient to render the mix suitable for screen printing and typically a quantity of binder weighing about one half of the total weight of lead, palladium and high temperature binding material is used.

Tests have been carried out (by weight) on inks having compositions as follows:

| Ink No. | Pd | Pb | Glass | Binder | Pd:Pb | Pd+Pb: Glass |
|---|---|---|---|---|---|---|
| A | 29.9 | 29.9 | 12.0 | 28.2 | 1:1 | 5:1 |
| B | 37.0 | 24.7 | 9.26 | 29.0 | 3:2 | 6.66:1 |
| C | 43.6 | 23.5 | 1.34 | 31.5 | 13:7 | 49:1 |
| D | 42.8 | 23.0 | 3.29 | 30.9 | 13:7 | 20:1 |
| E | 42.0 | 22.6 | 5.15 | 30.25 | 13:7 | 12.5:1 |
| F | 41.4 | 22.3 | 6.40 | 29.9 | 13:7 | 10:1 |
| G | 40.6 | 21.85 | 8.21 | 29.35 | 13:7 | 7.6:1 |
| H | 41.9 | 18.0 | 12.0 | 28.1 | 7:3 | 5:1 |
| I | 52.4 | 13.1 | 3.74 | 30.8 | 4:1 | 17.5:1 |

NOTE: Inks Nos: A and I fall outside the scope of the present invention and the compositions and test results are included for comparison only.

In each of the above inks the palladium was in the form of a commercially available palladium powder supplied by Englehard Industries Limited, under their designation No: 6408. This powder consists of spherical particles with a nominal size of 2.5 microns. The lead was derived from a commercially available paste dispersion in Shellsol E which was rendered in a dry state and free from dispersion by solvent washing and subsequent drying. The powder typically assayed 99.5% lead, with an oxide content calculated as Pb of 0.5%. Mean weight particle size was about 8 microns corresponding to a mean particle size of approximately 2 microns. The glass used was a vitreous glass frit supplied by C. E. Ramsden & Company Limited, under the designation No: F1257. This glass has a softening range of 410° to 420° C and a coefficient of thermal expansion of $8.1 \times 10^{-6}$ per ° C which is close to that of the high alumina ceramics used in thick film circuit work. The glass is known to contain PbO, ZnO, $SiO_2$ and $B_2O_3$, but the proportions of these constituents are not known. The binder liquid used was a commercially available binder supplied by C. E. Ramsden & Company Limited under the designation No: M295 which has a measured viscosity at 20° C of 9200 Redwood seconds.

For test purposes the inks were screen printed through a 165 mesh screen in .080 inch square areas on high alumina ceramic tiles 1 inch × 1 inch and .040 inch and .025 inch thick. The ink was dried in each case at 120° ± 10° for 10 minutes and then fired in air for 10 minutes at between 805° and 880° C.

The tests carried out on the printed and fired substrates comprised test of solderability with a 62% Pb, 36% 2% Ag solder after fluxing the commercially available fluxes supplied by Multicore Solders Limited under the designation No: PC21A, which is a non-corrosive liquid flux, and PC101 which is a socalled active liquid flux. Leaching of the metal components of the inks was observed with the tiles immersed in the molten solder and the strength of joints made by soldering to the tinned areas of copper wires 0.028 inches in diameter was measured both when the joints were first made, and again after artificial ageing. The "leaching time" referred to below is the time taken for leaching to have a visible effect on the shape of the square areas.

INK A

Tinning of the areas was effected after two dips in the solder bath using flux PC101. The areas could also be tinned using flux PC101 and a soldering iron. The areas could not be tinned with PC21A flux. Leaching took 4½ minutes in the solder bath, but only 7 to 8 seconds with a soldering iron. The initial tensile strength of the joint was on 2,500 grms. No ageing tests carried out.

INK B

Tinned by three of four dips in the solder bath with flux PC21A. Leaching time: 6 minutes in the soldering bath, 1 to 1.25 minutes with a soldering iron. Initial tensile strength 7800 grms. No ageing tests.

INK C

Tinned by two dips in bath or single dip of about 25 seconds using PC21A. No leaching tests. Initial tensile strength 5,700 grms. Tensile strength after 24 days ageing at 130° C 5,000 grms. One sample aged at 100° C for 12 days had a tensile strength of 8,000 grms. Samples aged by cyclic temperature variations between −40° C and +130° C failed to achieve tensile strength over 500 grms, after the first day's ageing.

INK D

Tinned with PC21A after single dip within 25 seconds. Some were tinned after only 5 to 10 seconds. Leaching time: 4 to 6 minutes in the soldering bath. Initial average tensile strength 8,000 grms. Strength after ageing 23 days at 130° or 100° C 8,000 grms, samples tested after 14 days of cyclic ageing between −40° and +130° C still had a tensile strength of 3,000 gms, but the joints failed after a further 11 days of cyclic ageing.

INK E

Tinned after two or three dips in solder bath using PC21A. Other tests not completed.

INK F

Tinned after two or three dips using PC21A. Tinned reasonably well with soldering iron. Average tensile strength 7,800 gms. No leaching or ageing tests conducted.

INK G

Tinned after two or three dips in bath with PC21A. Leaching time in soldering bath over 7 minutes, with soldering iron about 5 minutes. Average tensile strength 9,000 gms. No ageing tests.

INK H

Failed to tin with PC21A. Tinned with PC101 in 2 seconds. Leaching time in soldering bath 4.25 minutes. Initial average tensile strength: 6,500 gms.

Strength after aging at 130° C for 72 days, 4,200 gms.

Strength after cyclic ageing — 55° to 130° C.

for 72 days—800 gms.

for 41 days—1,800 gms.

for 27 days—3,600 gms.

for 5 days—3,800 gms.

Strength after cyclic ageing −40° to +100° C for 39 days—4,000 gms.

INK I

Tinned after three dips using PC21A. Would not tin using PC21A and soldering iron.

Initial tensile strength 5,480 grms.

No leaching or ageing tests.

On the basis of these tests it was concluded that by virtue of the preference for using a non-corrosive flux and the ability of the printed and fired areas to resist leaching the optimum palladium:lead ratio is 13:7 with a metal:glass ratio in the range of 20:1 to 20:3.

The inks referred to can also be printed and fired on glass substrates or ceramic substrates coated with a glass layer.

We claim:

1. An ink for use in the manufacture of a thick film circuit, said ink comprising palladium powder, lead powder, the ratio of the weight of the palladium powder to the weight of the lead powder being in the range of 3:1 to 3:2 an inorganic bonding material and a binder liquid.

2. An ink as claimed in claim 1 in which the ratio of palladium to lead is approximately 13:7 by weight.

3. An ink as claimed in claim 2 in which the ratio of the total weight of metal powder to the weight of the inorganic bonding material is in the range 50:1 to 5:1.

4. An ink as claimed in claim 3 in which the ratio of the weight of metal powder to the weight of inorganic bonding material is in the range of 20:1 to 20:3.

5. An ink as claimed in claim 4 in which the high temperature binder is a glass frit.

6. An ink as claimed in claim 5 in which the glass frit comprises PbO, ZnO, $SiO_2$ and $B_2O_3$, and has a softening range of 410° to 420° C and a coefficient of thermal expansion in the region of $8.1 \times 10^{-6}$ per ° C.

7. An ink as claimed in claim 6 in which the binder liquid is present in the range of 28 to 31.5% by weight and has a viscosity at 20° C of 9,200 Redwood seconds.

* * * * *